Figure 2:
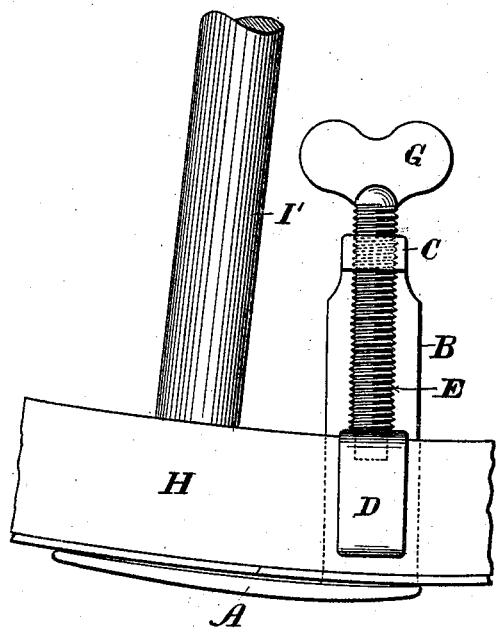
Figure 3:
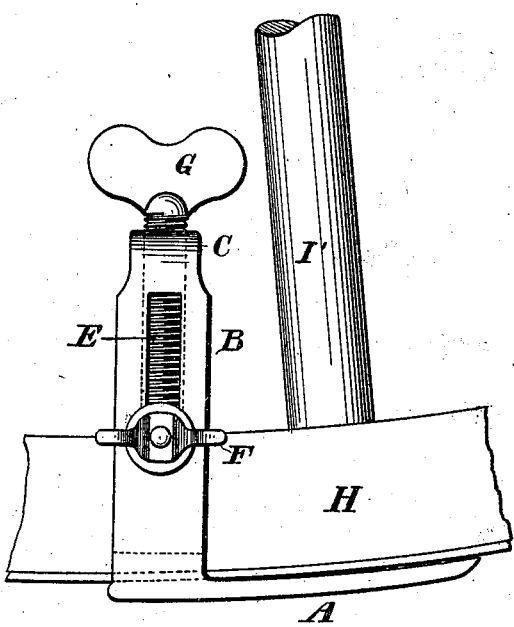
Figure 1:
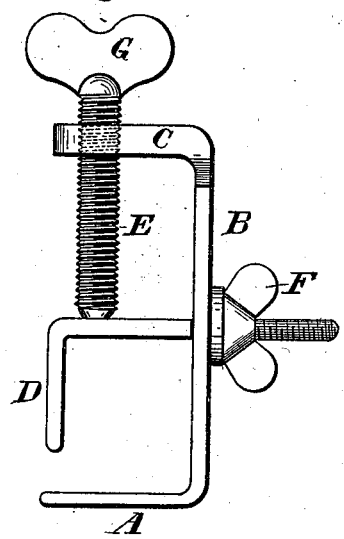

(No Model.)

J. W. ANGIER.
TIRE CLAMP.

No. 504,017. Patented Aug. 29, 1893.

Witnesses:
H. C. Marsden
J. W. Custer

Inventor:
James W. Angier

UNITED STATES PATENT OFFICE.

JAMES W. ANGIER, OF MERCHANTVILLE, NEW JERSEY.

TIRE-CLAMP.

SPECIFICATION forming part of Letters Patent No. 504,017, dated August 29, 1893.

Application filed August 23, 1892. Serial No. 443,927. (No model.)

*To all whom it may concern:*

Be it known that I, JAMES W. ANGIER, a citizen of the United States, residing at Merchantville, in the county of Camden and State of New Jersey, have invented a new and useful Tire-Clamp, of which the following is a specification.

My invention relates to a clamp for the purpose of clamping broken or loose tires upon their respective wheels.

The object of my invention is (first) to clamp a tire though the break be directly over a spoke; (second) to gage the same clamp to different sized wheels; (third) to manipulate the working of said clamp without wrench or other tools the work being accomplished by the hand and fingers only. I accomplish these objects by the clamp illustrated in the accompanying drawings in which—

Figure (1) is an end view of clamp, and Figs. (2) and (3) side views of the same as adjusted to the felly of a wheel.

Similar letters refer to like parts throughout the several views.

The main piece consists of the projection (A) perpendicular part (B) and base (C); the other piece D I will designate as the gage. The perpendicular part B has a slot (E). The gage (D) is rectangular in cross section one end being in the form of a bolt with a thread which passes through the slot (E) to receive a winged nut (F) the other end turning down as shown in Fig. (2) to come in contact with the felly. The gage (D) can be adjusted by the winged nut (F). The base (C) receives a winged screw bolt (G) which comes in contact with the gage (D) raising the former against the felly (H) thereby forcing the cap (A) down upon the tire and accomplishing the desired object.

What I claim, and desire to secure by Letters Patent of the United States, is—

1. The clamp consisting of the main slotted piece having the projections A. C. and screw bolt G. and a movable gage provided with a winged nut F, substantially as described.

2. The herein described clamp consisting of a main part having a slot to receive an adjustable gage piece a projecting part A and a part C provided with a screw threaded opening to receive a screw bolt substantially as described.

3. The herein described clamp having the projection A, the gage to clamp the felly and the screw bolt G. for applying pressure to the tire all as set forth.

JAMES W. ANGIER.

Witnesses:
F. G. MARSDEN,
FREDERICK RITTER.